(12) United States Patent
Tada et al.

(10) Patent No.: US 10,133,939 B2
(45) Date of Patent: Nov. 20, 2018

(54) IMAGE PROCESSING APPARATUS

(71) Applicant: FUJITSU TEN LIMITED, Kobe-shi, Hyogo (JP)

(72) Inventors: Kenji Tada, Kobe (JP); Yuji Maruyama, Kobe (JP); Nobuyuki Batou, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 134 days.

(21) Appl. No.: 15/292,619

(22) Filed: Oct. 13, 2016

(65) Prior Publication Data

US 2017/0124403 A1    May 4, 2017

(30) Foreign Application Priority Data

Oct. 29, 2015  (JP) .................................. 2015-212710

(51) Int. Cl.
*B60R 1/00* (2006.01)
*G06K 9/00* (2006.01)

(52) U.S. Cl.
CPC ............ *G06K 9/00791* (2013.01); *B60R 1/00* (2013.01); *B60R 2300/404* (2013.01); *B60R 2300/806* (2013.01); *B60R 2300/8046* (2013.01)

(58) Field of Classification Search
CPC .............. B60R 1/00; B60R 2300/8046; G06K 9/00791
USPC ......................................................... 348/148
See application file for complete search history.

(56) References Cited

U.S. PATENT DOCUMENTS

| | | | | |
|---|---|---|---|---|
| 4,177,514 A | * | 12/1979 | Rupp | G06F 15/8007 712/17 |
| 4,228,495 A | * | 10/1980 | Bernhard | G05B 19/4147 700/180 |
| 4,835,532 A | * | 5/1989 | Fant | G06T 15/04 340/980 |
| 4,849,829 A | * | 7/1989 | Maruyama | G03G 15/01 358/451 |
| 4,949,391 A | * | 8/1990 | Faulkerson | G06F 3/0238 382/313 |
| 6,112,273 A | * | 8/2000 | Kau | G06F 13/24 710/260 |
| 9,002,193 B2 | * | 4/2015 | Izukawa | H04N 5/23241 396/532 |
| 2010/0256880 A1 | * | 10/2010 | Sato | F16H 59/105 701/55 |
| 2011/0231640 A1 | * | 9/2011 | Avadhanam | G06F 9/4403 713/2 |
| 2013/0127980 A1 | * | 5/2013 | Haddick | G06F 3/013 348/14.08 |
| 2013/0332033 A1 | * | 12/2013 | Debouk | B60R 16/02 701/49 |
| 2014/0300770 A1 | * | 10/2014 | Izukawa | H04N 5/23241 348/222.1 |

(Continued)

FOREIGN PATENT DOCUMENTS

JP  2014-197370 A  10/2014
JP  2015-198344 A  11/2015

Primary Examiner — Shan E Elahi
(74) Attorney, Agent, or Firm — Oliff PLC

(57) ABSTRACT

Even if a problem has occurred with respect to a multimedia micro-computer that generates a composite image including guiding lines, while a gearshift of a vehicle is in reverse, a reset process is not performed for the multimedia micro-computer. The reset process is performed after the gearshift is determined to have moved from reverse.

8 Claims, 11 Drawing Sheets

(56) References Cited

U.S. PATENT DOCUMENTS

2015/0199955 A1* 7/2015 Draganic ............... G10K 15/02
　　　　　　　　　　　　　　　　　　　　　　381/86

* cited by examiner

IMAGE PROCESSING APPARATUS

BACKGROUND OF THE INVENTION

Field of the Invention

The invention relates to a technology for image processing.

Description of the Background Art

An image processing apparatus has been conventionally known that includes a camera installed on a vehicle to capture an image of an area behind the vehicle and that displays the captured images on a display in the vehicle. While watching the images showing the area behind the vehicle displayed on the display, a driver backs the vehicle, confirming an obstacle and the like behind the vehicle. If a problem has occurred with respect to a micro-computer that performs image processing, such an image processing apparatus immediately performs a reset process to restore the process quickly. Unless the reset process is performed for the micro-computer having the problem, the image displayed on the display is not updated. The driver may back the vehicle without noticing that the vehicle is approaching the obstacle and the like.

However, if the micro-computer that performs the image processing is reset, an image signal is not generated during a reset process so that there is no image is displayed on the display. While the driver is backing the vehicle, if an image suddenly disappears from the display due to the reset process performed for the micro-computer, the driver needs to check safety additionally so that the driver may have a problem with backing the vehicle.

SUMMARY OF THE INVENTION

According to one aspect of the invention, an image processing apparatus that processes images includes: a shift sensor that detects a position of a gearshift of a vehicle on which the image processing apparatus is mounted, and outputs a shift signal; an image processor that acquires a captured image of an object in surroundings of the vehicle and that outputs the acquired captured image to a display to display the acquired captured image on the display in a case where the image processor determines that the shift signal indicates that the position of the gearshift is a predetermined position, the captured image being an image of the object captured by a camera mounted on the vehicle; a first micro-computer that controls the image processor and that combines the captured image with a diagram before the captured image is output by the image processor to the display; the image processor detecting whether a problem exists in the first micro-computer based on the captured image combined with the diagram supplied from the first micro-computer; and a second micro-computer that performs a reset process for the first micro-computer when the image processor has detected that the problem exists with respect to the first micro-computer. In a case where the image processor has detected the problem with respect to the first micro-computer while the position of the gearshift is determined to be the predetermined position, the second micro-computer does not perform the reset process while the position of the gearshift remains the predetermined position, and the second micro-computer performs the reset process after the position of the gearshift is determined to have changed from the predetermined position.

Since the reset process is performed after the position of the gearshift is determined to have changed from the predetermined position, it is possible to prevent the combiner and the image processor controlled by the combiner from being reset so that the captured image can be continuously displayed while the position of the gearshift of the vehicle is not changed.

According to another aspect of the invention, the predetermined position of the gearshift is a reverse position.

Since the reset process is performed after the position of the gearshift is determined to have changed from a position for backing the vehicle, it is possible to prevent the combiner and the image processor controlled by the combiner from being reset while the driver backing the vehicle.

Therefore, an object of the invention is to perform a reset process for a micro-computer without interrupting driving of a vehicle when the micro-computer has a problem.

These and other objects, features, aspects and advantages of the invention will become more apparent from the following detailed description of the invention when taken in conjunction with the accompanying drawings.

DESCRIPTION OF THE EMBODIMENTS

Embodiments of the invention will be described below with reference to the drawings.

<1. First Embodiment>

<1-1. Outline>

Figure 1:
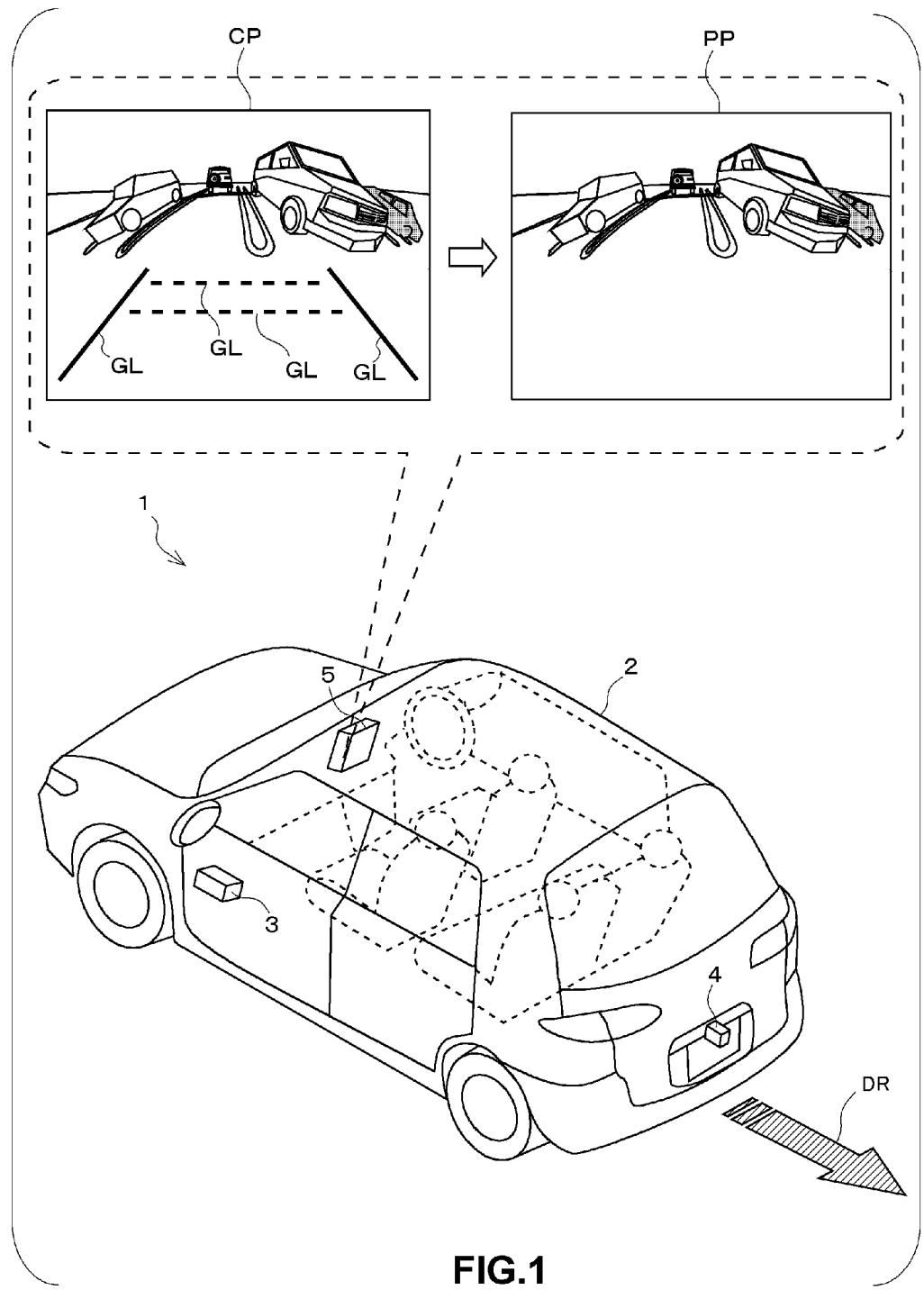
FIG. 1 illustrates an outline of an image processing system.

FIG. 1 illustrates an outline of an image processing system 1 of a first embodiment. The image processing system 1 is a system that captures images of surroundings of a vehicle 2, for example, an area behind the vehicle 2, by a camera 4 installed on the vehicle 2 and that displays the captured images on a display 5 in the vehicle. Guiding lines GL indicative of a vehicle width and a distance from a rear end of the vehicle 2 is superimposed on the captured images. Therefore, a driver of the vehicle 2 can understand a distance to an obstacle and a possibility of a contact with the obstacle. In a case where the driver is driving the vehicle 2 in a travelling direction DR, for example, in a backward direction, watching such a composite image CP, the driver can accurately understand a location of the obstacle in the surroundings of the vehicle 2, especially, in a blind corner and can drive more safely.

A micro-computer that generates the composite images CP performs complicated arithmetic processes that may cause a problem to the processes. If the micro-computer has a problem, the micro-computer does not perform the image processing and does not output accurate images. For example, the micro-computer continuously outputs a same image. Therefore, the image processing system 1 performs a reset process for the micro-computer having a problem with the processes to reset the micro-computer back to a normal state.

However, if the micro-computer is reset while the driver is driving the vehicle 2, an image on the display 5 suddenly disappears. Therefore, the driver may be confused and thus may have a problem with the driving operation. Moreover, if a same image is continuously displayed on the display 5 without the reset process, the driver may not notice that the vehicle 2 is approaching the obstacle or that the obstacle is entering an area in the travelling direction DR of the vehicle 2 so that the vehicle 2 may come into contact with the obstacle.

Even if the micro-computer that generates the composite images CP has a problem, the image processing system 1 of this embodiment does not immediately perform the reset process but displays on the display 5, until the position of the gearshift is changed, a captured image PP, a captured image before being combined with the guiding lines GL, instead of the composite image CP. Thus, although the composite image CP is not displayed, the display 5 does not become a no-image state while the driver is driving the vehicle 2, and also the same image is not continuously displayed on the display 5. Therefore, the driver is not confused by the sudden no-image state of the display 5. The driver can continue driving the vehicle 2, adequately watching the obstacle in the surroundings of the vehicle 2 on the captured image PP. The image processing system 1 will be described in detail below.

<1-2. Configuration>

Figure 2:
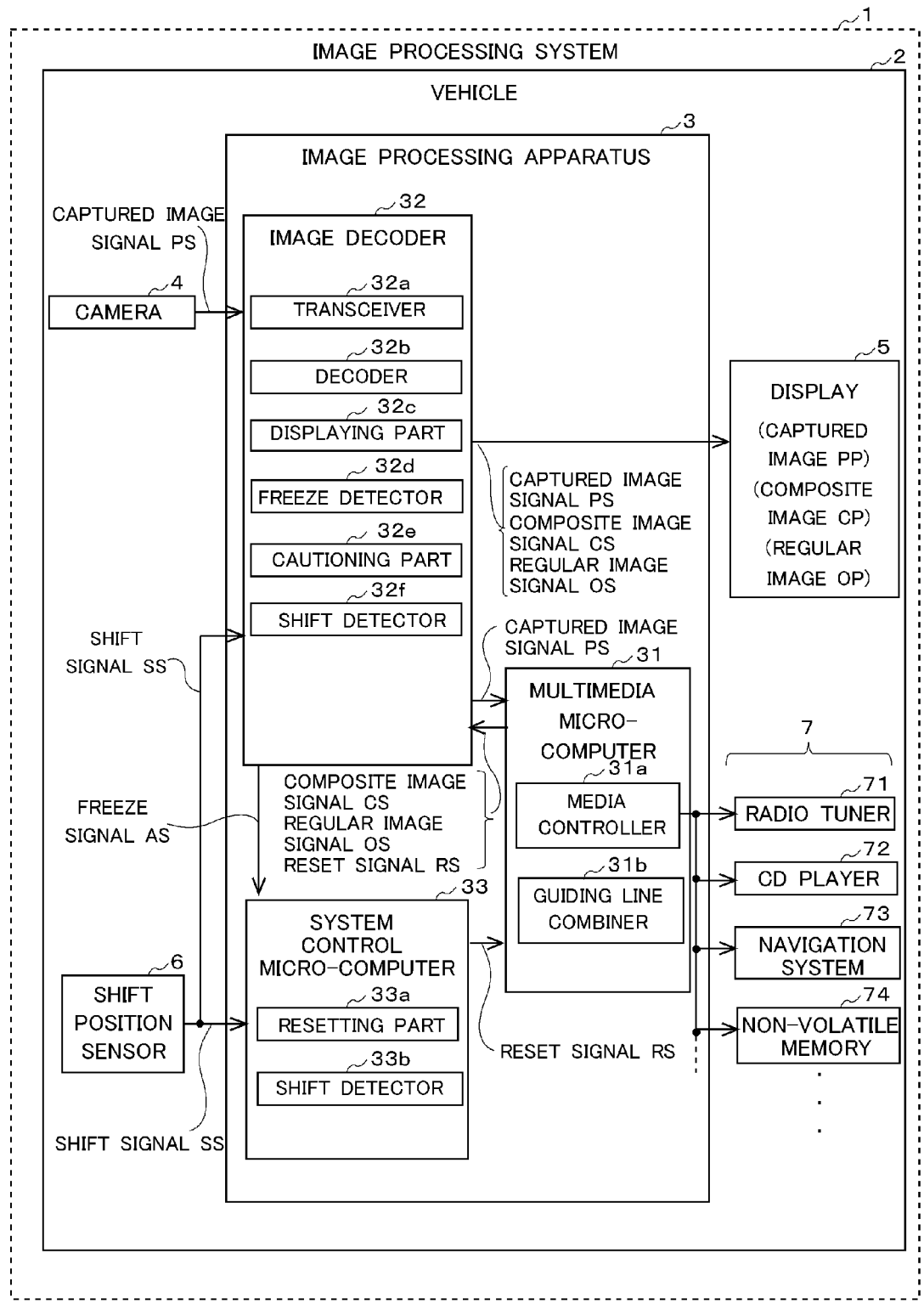
FIG. 2 illustrates a block diagram showing a configuration of the image processing system.

FIG. 2 illustrates a configuration of the image processing system 1 and especially illustrates a block diagram showing a configuration of an image processing apparatus 3. The image processing system 1 includes the image processing apparatus 3, the camera 4, the display 5, a shift position sensor 6 and periphery equipment 7 that are mounted on the vehicle 2.

The vehicle 2 is transportation equipment, such as a car. The vehicle 2 may be a train, a ship, a boat, an airplane and the like, in addition to a car. The vehicle 2 may be equipment operated by an operator.

The image processing apparatus 3 is installed in the vehicle 2 and is an electronic control apparatus that displays the images captured by the camera 4 and images for various devices installed in the vehicle 2, on the display 5. The image processing apparatus 3 is the electronic control apparatus that includes an antenna for wireless communication with an outside device. The image processing apparatus 3 includes an image decoder 32, a multimedia micro-computer 31 and a system control micro-computer 33. Functions of the image decoder 32, the multimedia micro-computer 31 and the system control micro-computer 33 will be described later.

The camera 4 is a video camera that is installed, for example, on a rear portion of the vehicle 2, facing backward, and that captures images of an object in the area behind the vehicle 2 and then generates image signals of the captured images.

The display 5 is an image display device that displays still images or moving images based on the image signals output from the image processing apparatus 3. For example, the display 5 is a liquid crystal display (LCD) or a plasma display (PDP). The display 5 functions as a display apparatus in this embodiment The shift position sensor 6 is a sensor that detects a position of a gearshift (not illustrated) for gear change. The position of the gearshift is a park position (P), a reverse position (R), a neutral position (N) and a drive position (D), etc. Once detecting the position of the gearshift, the shift position sensor 6 sends a shift signal SS indicative of the detected position of the gearshift to the system control micro-computer 33.

The periphery equipment 7 is various devices (multimedia devices) that are installed in the vehicle 2. The periphery equipment 7 is, for example, a radio tuner 71, a CD player 72, and a navigation system 73 and a non-volatile memory 74, etc. The periphery equipment 7 is controlled by the multimedia micro-computer 31. The multimedia micro-computer 31, for example, generates an audio operation screen for the radio tuner 71 and/or the CD player 72, and sends the audio operation screen to the image decoder to display the generated screen on the display 5. Moreover, the multimedia micro-computer 31 generates map images for navigation and provides a route guidance. The multimedia micro-computer 31 causes the non-volatile memory 74 to store various types of the data input by a user. Some among examples of the input data are a frequency of a radio station that the user selected with the radio tuner 71 and destinations input into the navigation system 73.

Next, the functions of the multimedia micro-computer 31, the image decoder 32 and the system control micro-computer 33 will be described below.

The multimedia micro-computer 31 is a micro-computer that includes a CPU, a RAM and a ROM, not illustrated, and that controls the image decoder 32 and the periphery equipment 7. Control of the image decoder 32 and the periphery equipment 7, etc. is concentrated on the multimedia micro-computer 31 so that the image processing apparatus 3 is configured in a simple structure. Moreover, the multimedia micro-computer 31 combines the guiding lines GL for driving support with the captured image that is captured by the camera 4 and that is sent from the image decoder 32. The multimedia micro-computer 31 includes a media controller 31a and a guiding line combiner 31b. The multimedia micro-computer 31 functions as a combining part in this embodiment. The guiding lines GL function as a diagram in this embodiment. Further, the composite image functions as a captured image combined with a graphic in this embodiment.

The media controller 31a controls the image decoder 32 and the periphery equipment 7. For example, based on an operation of the user, the media controller 31a adjusts a frequency of the radio tuner 71 and a volume. Moreover, the media controller 31a generates a display screen for controlling the periphery equipment 7. Some among examples of the display screens are a music selection screen for the CD player 72 and a map screen for the navigation system 73. Once generating the display screen, the media controller 31a sends the generated display screen to the image decoder 32.

The guiding line combiner 31b combines the guiding lines GL for driving support with the captured image captured by the camera 4, showing the area behind the vehicle 2. The guiding lines GL are stored in a memory, not illustrated, beforehand as an image data. Once receiving the captured image from the image decoder 32, the guiding line combiner 3 1b combines the guiding lines GL and then sends the combined captured image back to the image decoder 32.

The image decoder 32 is an integrated circuit that converts the image signals sent from the camera 4 and the multimedia micro-computer 31 into image signals such that images can be displayed on the display 5. The image decoder 32 is configured to be a subordinate incorporated in the multimedia micro-computer 31. Therefore, when the multimedia micro-computer 31 is reset, the image decoder 32 is reset along with reset of the multimedia micro-computer 31. The image decoder 32 includes a transceiver 32a, a decoder 32b, a displaying part 32c, a freeze detector 32d, a cautioning part 32e and a shift detector 32f. The image decoder 32 functions as an image processing part in this embodiment.

The transceiver 32a is a receiver that receives the image signals sent from the camera 4 and the multimedia micro-computer 31.

The decoder 32b decodes and converts the image signals sent from the camera 4 into the image signals such that images can be displayed on the display 5.

The displaying part 32c is a display control function that sends a composite image signal CS and a regular image signal OS that are sent from the multimedia micro-computer 31 and a captured image signal PS that is converted by the decoder 32b, to the display 5 to display the images on the display 5.

The displaying part 32c causes an image to be displayed on the display 5 according to a position of the gearshift. In other words, in a case where the position of the gearshift is the reverse position, the displaying part 32c displays an image showing the area behind the vehicle 2. In a case where the position of the gearshift is the drive position, the displaying part 32c displays the map image. In a case where the position of the gearshift is the park position, the displaying part 32c displays an audio screen.

The captured image signal PS is a signal of an image generated by the camera 4 by capturing an image of an object in the area behind the vehicle 2. Once the captured image signal PS is sent to the display 5, the display 5 shows the captured image PP showing the object in the area behind the vehicle 2. The captured image signal PS includes the image signals converted by the decoder 32b.

Moreover, the composite image signal CS is a signal of an image generated by the multimedia micro-computer 31 by combining an image showing the guiding lines GL with the captured image signal PS. Once the composite image signal CS is sent to the display 5, the display 5 displays the composite image CP generated by combining the image showing the guiding lines GL with the image of the object in the area behind the vehicle 2.

The regular image signal OS is an image signal of an operation image and the like for the periphery equipment 7 and is generated by the multimedia micro-computer 31 for the driver to operate the periphery equipment 7. The regular image signal OS is for the operation image for an audio, such as the radio tuner 71 and the CD player 72. Moreover, the regular image signal OS is for the map image for the navigation system. Once the regular image signal OS is sent to the display 5, the display 5 displays a regular image OP, such as an operation screen for operating the periphery equipment 7.

The freeze detector 32d detects a problem with the multimedia micro-computer 31. In other words, the freeze detector 32d detects presence or absence of a problem with the composite image CP generated based on the composite image signal CS sent from the multimedia micro-computer 31. The freeze detector 32d functions as a problem detector in this embodiment.

The multimedia micro-computer 31 simultaneously controls a plurality of the periphery equipment 7 so that the multimedia micro-computer 31 performs complicated data processes. Therefore, a problem occurs on the multimedia micro-computer 31 more often as compared to other micro-computers. If the multimedia micro-computer 31 has a problem, the multimedia micro-computer 31 may output a frozen image (a same screen with no change).

When backing the vehicle 2, the driver of the vehicle 2 generally does not gaze at an image on the display 5 but sees various directions to check safety. Therefore, if the multimedia micro-computer 31 outputs the frozen image, the driver does not immediately notice that the image is frozen. In this case, the driver cannot recognize, from the image on the display 5, that the vehicle 2 is approaching an obstacle in the area behind the vehicle 2 or that an obstacle enters a travelling course of the vehicle 2. Thus, there is a possibility that the vehicle 2 comes into contact with the obstacle.

The freeze detector 32d determines whether or not the composite image CP is a frozen image by determining whether or not colors of pixel data at nine portions of an image are changing. In a case where there is no change in the colors of the pixel data, the displayed image is determined to be the frozen image. Once determining that the composite image CP is frozen, the freeze detector 32d sends a freeze signal indicating that the composite image CP is frozen, to the system control micro-computer 33.

In a case where the freeze detector 32d detects the problem with the multimedia micro-computer 31 based on the composite image CP, the cautioning part 32e gives the driver of the vehicle 2 a notification of occurrence of the problem and of implementation of the reset process of the system. The cautioning part 32e gives the notice by combining a notification image indicating that the problem has occurred and thus the reset process will be performed with the captured image captured by the camera 4. The cautioning part 32e functions as a notifying part in this embodiment.

Figure 3:
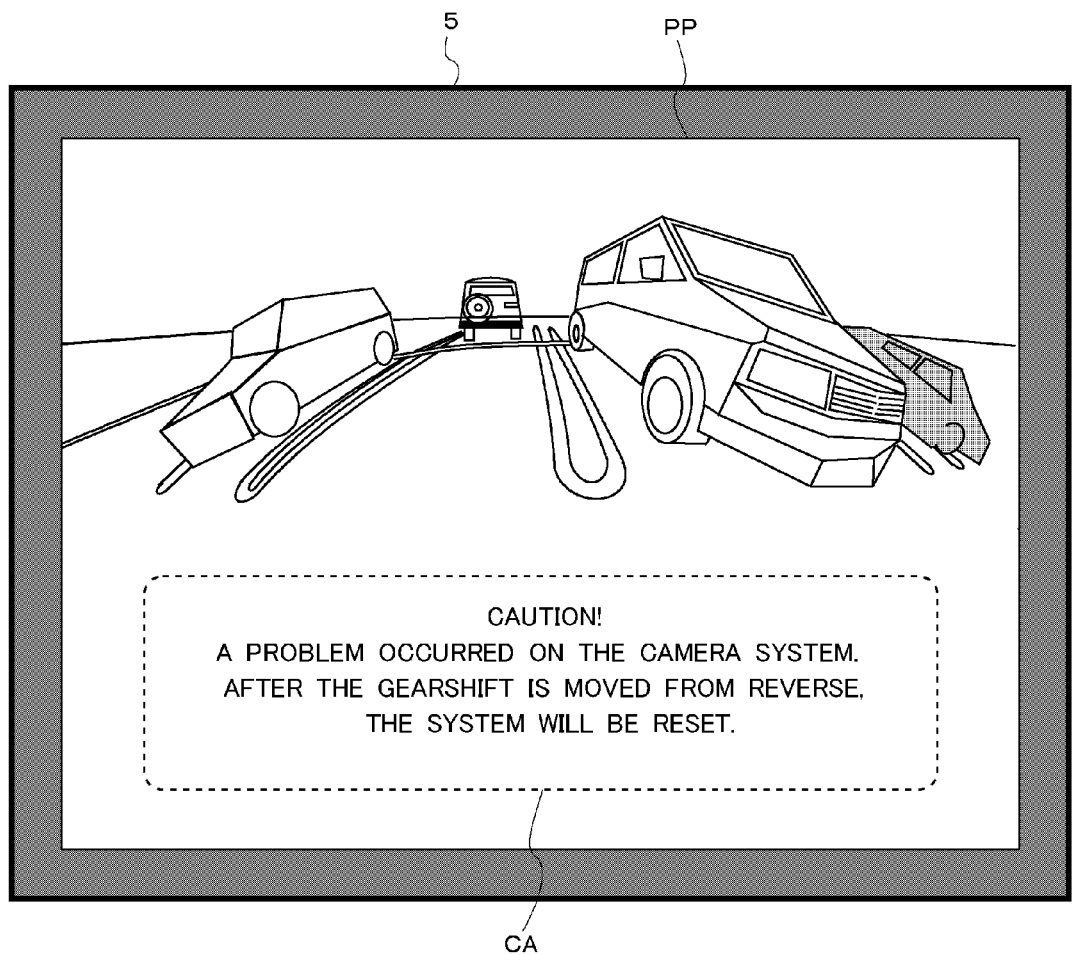
FIG. 3 illustrates a display example.

FIG. 3 illustrates an example of a notifying image CA generated by the cautioning part 32e. The notifying image CA is image data indicative of texts showing to the driver that the problem has occurred with respect to the system and thus the reset process will performed. For example, "CAUTION! A problem has occurred on the camera system. After the gearshift is moved from the reverse position, the system will be reset."

The notifying image CA is stored in a memory, not illustrated, and is read out by the cautioning part 32e when the freeze detector 32d detects a problem with the multimedia micro-computer 31. Once reading out the notifying image CA, the cautioning part 32e combines the notifying image CA with the captured image PP by superimposing the notifying image CA with the captured image PP. The captured image PP combined with the notifying image CA is displayed on the display 5 by the displaying part. Thus, the driver can understand that the problem occurred on the system and the system will be reset while seeing a situation of the area behind the vehicle 2.

With reference back to FIG. 2, the shift detector 32f will be described below. The shift detector 32f receives the shift signal SS indicative of the position of the gearshift sent from the shift position sensor 6, and detects the input position of the gearshift. For example, in a case where the shift signal SS indicates the reverse position, the shift detector 32f detects that the input position of the gearshift is the reverse position. After a predetermined time period (chattering preventive period) has passed from a change of the position of the gearshift, the shift detector 32f determines the changed position of the gearshift. When the position of the gearshift is changed from a current position to a desired position, there is a case where the gearshift goes through a different position. In that case, the shift detector 32f instantaneously detects the different position (so-called chattering). Thus, even if the shift detector 32f detects a position of the gearshift, the shift detector 32f does not immediately determine that the position of the gearshift has been changed. In a case where the position of the gearshift continues for the chattering preventive period, the shift detector 32f determines that the position of the gearshift has been changed. In other words, the shift detector 32f determines that the position of the gearshift for control (control gearshift position). The chattering preventive period is, for example, 500 msec. The shift detector 32f functions as a detecting part that detects the position of the gearshift of the vehicle 2 in this embodiment.

The system control micro-computer 33 includes a CPU, a RAM and a ROM, not illustrated, and is a micro-computer that performs power supply management of the image processing apparatus 3 and the periphery equipment 7. The system control micro-computer 33 includes a shift detector 33b and a resetting part 33a.

The shift detector 33b receives the shift signal SS indicative of the position of the gearshift sent from the shift position sensor 6, and then detects the input position of the gearshift. For example, in a case where the shift signal SS indicates the reverse position, the shift detector 33b detects that the input position of the gearshift is the reverse position.

The resetting part 33a sends a reset signal RS to the multimedia micro-computer 31, and performs the reset process for the multimedia micro-computer 31. The resetting part 33a sends the reset signal RS to the periphery equipment 7 via a signal line, not illustrated, and then performs the reset process. The reset process means a process that mandatorily initializes registers in the CPU of the multimedia micro-computer 31. A reset process period is about 1.5 sec. The resetting part 33a may perform the reset process by turning off and on the power supply to the multimedia micro-computer 31 and the periphery equipment 7, instead of sending the reset signal RS. The resetting part 33a functions as a reset means in this embodiment.

<1-3. Steps>

Figure 4:
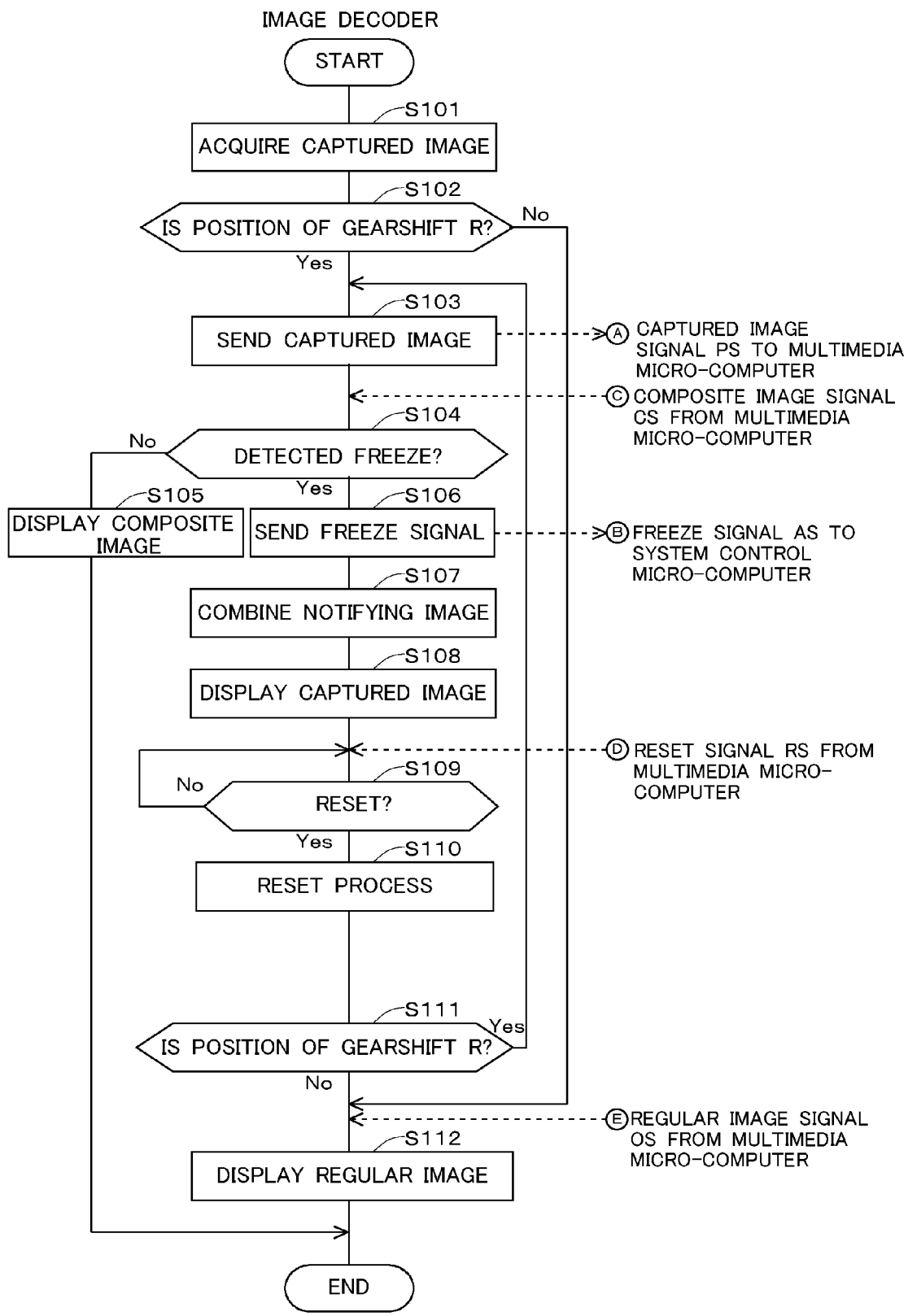
FIG. 4 illustrates a flowchart showing steps of a process of an image decoder.

Next, steps of a process performed by the image processing apparatus 3 will be described. FIG. 4 illustrates a flowchart showing the steps of the process of the image decoder 32 included in the image processing apparatus 3. The steps of the process of the image decoder 32 are repeatedly performed in a predetermined time cycle.

Once the process starts, the transceiver 32a acquires the captured image signal PS of the image captured and sent by the camera 4 (a step S101). Once the transceiver 32a acquires the captured image signal PS, the decoder 32b converts the captured image signal PS into an image signal in a format in which the image signal can be displayed on the display 5.

Next, the shift detector 32f determines whether or not the position of the gearshift is the reverse position (a step S102). The shift detector 32f, as described above, determines the position of the gearshift based on the shift signal SS sent from the shift position sensor 6.

In a case where the shift detector 32f determines that the position of the gearshift is not the reverse position (No in the step S102), the transceiver 32a acquires the regular image signal OS sent from the multimedia micro-computer 31. Once the transceiver 32a acquires the regular image signal OS, the displaying part 32c sends the regular image signal OS to the display 5 to display the image on the display 5 (a step S112). Thus, when the driver moves the gearshift to the park position or the drive position, the driver can watch a radio selection screen or the map screen.

In a case where the shift detector 32f determines that the position of the gearshift is the reverse position (Yes in the step S102), the transceiver 32a sends the captured image signal PS to the multimedia micro-computer 31 (a step S103).

Once the transceiver 32a receives the composite image signal CS generated by combining the guiding lines GL with the captured image sent from the multimedia micro-computer 31, the freeze detector 32d determines, using the foregoing method, whether or not a problem has occurred with respect to the multimedia micro-computer 31, i.e., whether or not the composite image CP is frozen (a step S104).

In a case where the freeze detector 32d determines that the composite image CP is not frozen (No in the step S104), the displaying part 32c sends the composite image signal CS to the display 5 to display the composite image CP (a step S105). Thus, the driver can back the vehicle 2, watching the composite image CP generated by combining the guiding lines GL with the image showing the area behind the vehicle 2. Once the displaying part 32c displays the composite image CP on the display 5, the process performed by the image decoder 32 ends. In this case, the steps of the step S101 and the subsequent steps are performed again after a predetermined time period.

On the other hand, in a case where the freeze detector 32d determines that the composite image CP is frozen (Yes in the step S104), the freeze detector 32d sends the freeze signal AS to the system control micro-computer 33 (a step S106).

Once the freeze detector 32d sends the freeze signal AS, the cautioning part 32e combines the captured image PP with the notifying image CA showing that the problem has occurred with respect to the system and thus the reset process will be performed (a step S107).

Once the cautioning part 32e combines the notifying image CA with the captured image PP, the displaying part 32c sends the captured image signal PS indicative of the captured image PP combined with the notifying image CA, to the display 5 (a step S108). Thus, the driver can recognize occurrence of the problem and implementation of the reset process, watching the captured image PP combined with the notifying image CA.

Once the displaying part 32c sends the captured image signal PS to the display 5, the image decoder 32 determines whether or not the image decoder 32 has received the reset signal RS from the multimedia micro-computer 31 (a step S109).

In a case where the image decoder 32 has not received the reset signal RS (No in the step S109), the image decoder 32 repeatedly performs the step S109 until the image decoder 32 receives the reset signal RS. Since the freeze detector 32d has sent the freeze signal AS, it is certain that the image decoder 32 will receive the reset signal RS. Thus, the image decoder 32 waits until the image decoder 32 receives the reset signal RS.

Once receiving the reset signal RS (Yes in the step S109), the image decoder 32 performs the reset process (a step S110). In other words, the image decoder 32 performs the reset process by mandatorily initializing resisters in the CPU of the image decoder 32.

Once the image decoder 32 ends the reset process, the shift detector 32f determines whether or not the position of the gearshift is the reverse position (a step S111).

In a case where the shift detector 32f determines that the position of the gearshift is the reverse position (Yes in the step S111), the process returns to the step S103. In this case, the steps S103 and the subsequent steps are performed again.

In a case where the shift detector 32f determines that the position of the gearshift is not the reverse position (No in the step S111), the displaying part 32c sends, to the display 5, the regular image signal OS sent from the multimedia micro-computer 31 to display the regular image OP on the display 5 (a step S112). Once the displaying part 32c displays the regular image OP on the display 5, the steps of the process of the image decoder 32 end.

Figure 5:
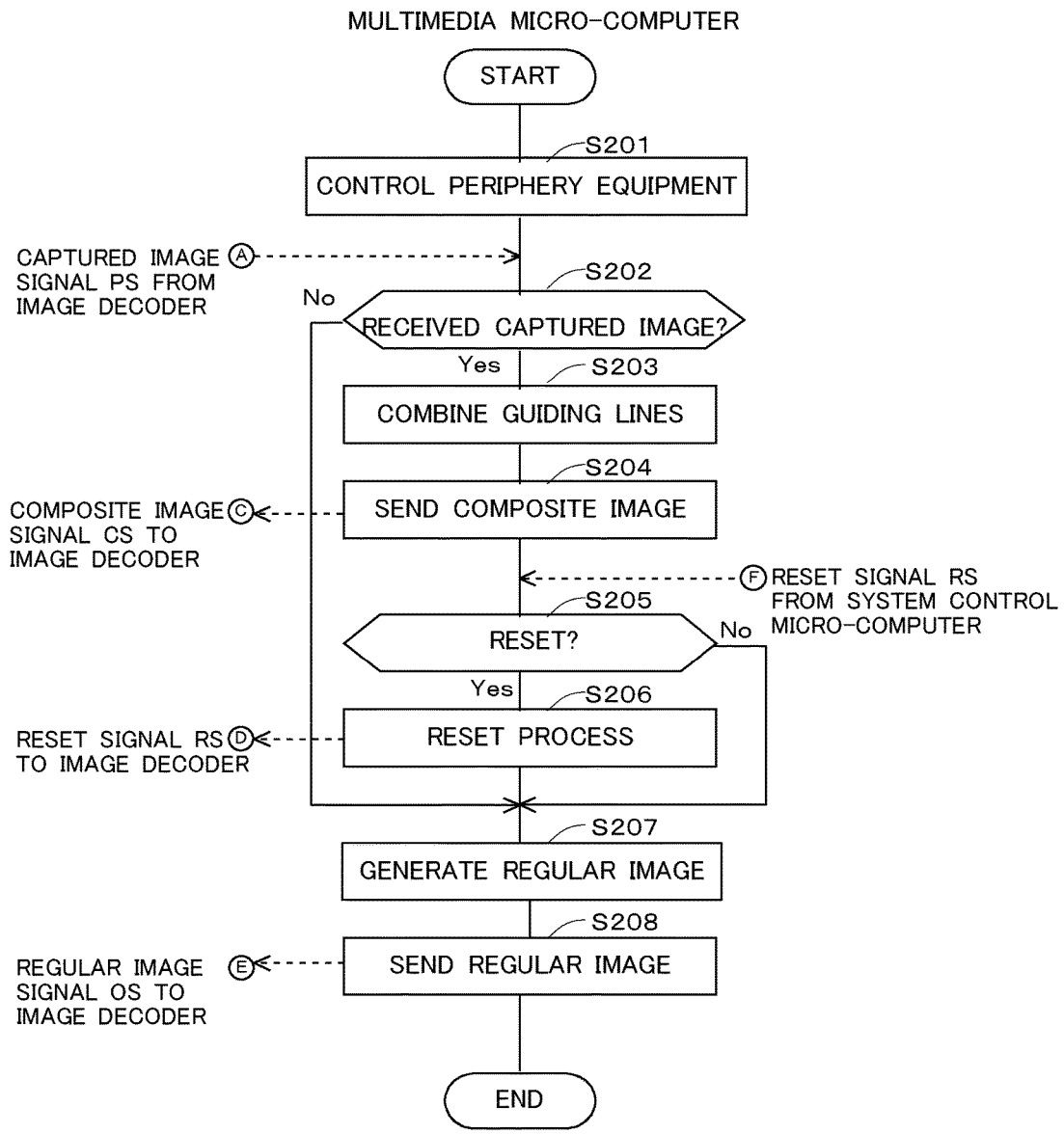
FIG. 5 illustrates a flowchart showing steps of a process of a multimedia micro-computer.

Next, steps of a process performed by the multimedia micro-computer 31 will be described. FIG. 5 illustrates a flowchart showing the steps of the process of the multimedia micro-computer 31. The steps of the process of the multimedia micro-computer 31 are performed in a predetermine time cycle.

Once the process starts, the media controller 31a controls the periphery equipment 7 based on an operation of the driver (a step S201).

Once the media controller 31a controls the periphery equipment 7, the guiding line combiner 31b determines whether or not the guiding line combiner 31b has received the captured image signal PS from the image decoder 32 (a step S202).

A process performed in a case where the guiding line combiner 31b has not received the captured image signal PS (No in the step S202), will be described later. On the other hand, in the case where the guiding line combiner 31b determines that the guiding line combiner 31b has received the captured image signal PS (Yes in the step S202), the guiding line combiner 31b combines the guiding lines GL with the captured image PP generated based on the captured image signal PS (a step S203).

Once combining the guiding lines GL with the captured image PP, the guiding line combiner 31b sends the composite image signal CS to the image decoder 32 (a step S204).

Once the guiding line combiner 31b sends the composite image signal CS to the image decoder 32, the multimedia micro-computer 31 determines whether or not the multimedia micro-computer 31 has received the reset signal RS from the system control micro-computer 33 (a step S205).

In a case where the multimedia micro-computer 31 determines that the multimedia micro-computer 31 has received the reset signal RS (Yes in the step S205), the multimedia micro-computer 31 performs the reset process (a step S206). In other words, the multimedia micro-computer 31 performs the reset process by mandatorily initializing the resisters of the CPU of the multimedia micro-computer 31. Once performing the reset process, the multimedia micro-computer 31 sends the reset signal RS to the image decoder 32.

In a case where the multimedia micro-computer 31 performs the reset process, where the guiding line combiner 31b determines that the guiding line combiner 31b has not received the captured image signal PS (No in the step S202) or where the multimedia micro-computer 31 determines that the multimedia micro-computer 31 has not received the reset signal RS (No in the step S205), the media controller 31a generates the regular image OP to control the periphery equipment 7 (a step S207).

Once generating the regular image OP, the media controller 31a sends the regular image signal OS indicative of the regular image OP, to the image decoder 32 (a step S208). Once the media controller 31a sends the regular image signal OS, the steps of the process of the multimedia micro-computer 31 end.

Figure 6:
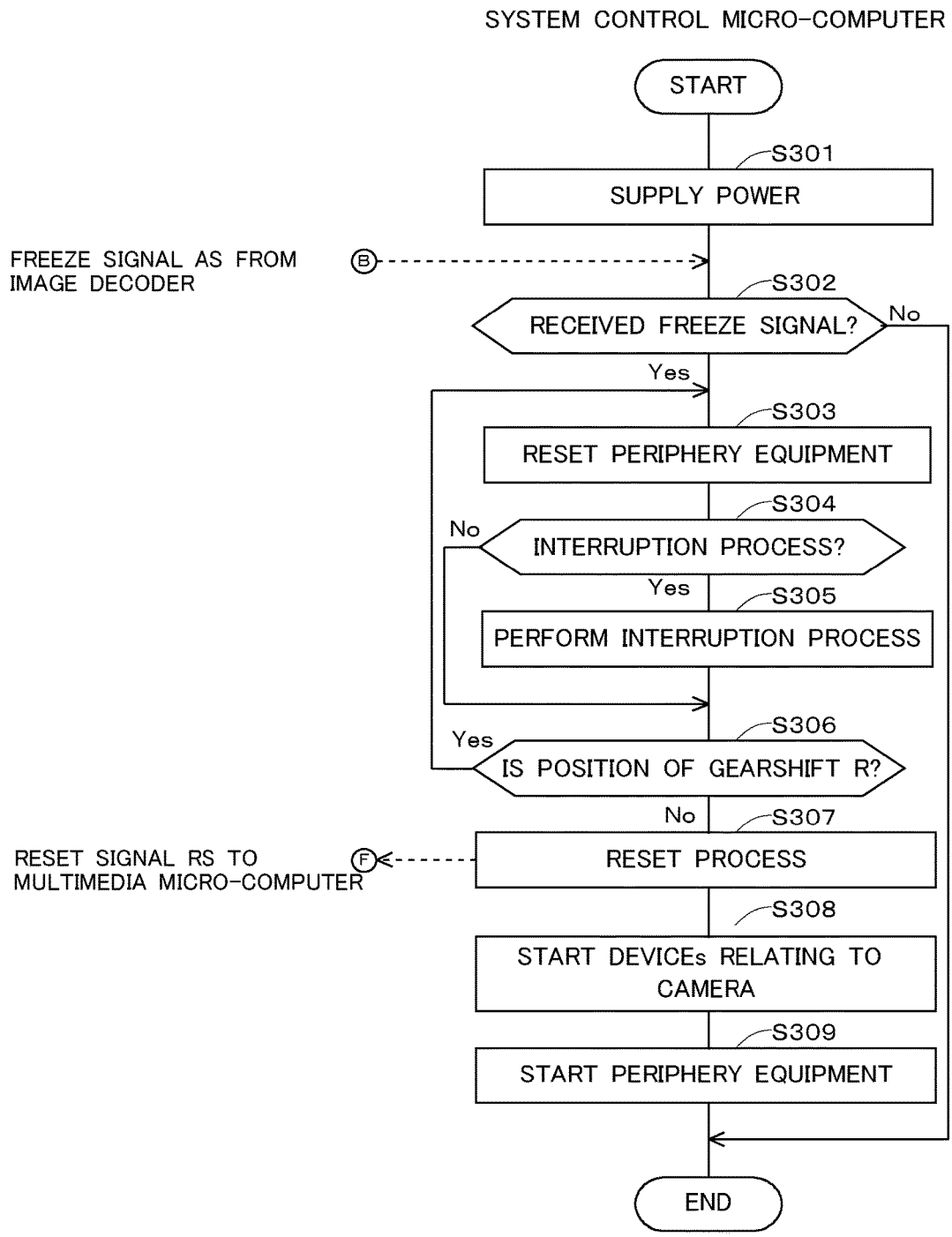
FIG. 6 illustrates a flowchart showing steps of a process of a system control micro-computer.

Next, steps of a process performed by the system control micro-computer 33 will be described. FIG. 6 illustrates a flowchart showing the steps of the process of the system control micro-computer 33. The steps of the process of the system control micro-computer 33 are repeatedly performed in a predetermined time cycle.

Once the process starts, the system control micro-computer 33 supplies power to the multimedia micro-computer 31 and the periphery equipment 7 (a step S301).

Next, the resetting part 33a determines whether or not the resetting part 33a has received the freeze signal AS sent from the image decoder 32 (a step S302).

In a case where the resetting part 33a determines that the resetting part 33a has not received the freeze signal AS (No in the step S302), the steps of the process of the system control micro-computer 33 end. However, the power supply in the step 5301 continues so that the multimedia micro-computer 31 and the periphery equipment 7 continue to perform processes.

In a case where the resetting part 33a determines that the resetting part 33a has received the freeze signal AS (Yes in the step S302), the resetting part 33a performs the reset process for the periphery equipment 7 (a step S303). In other words, the resetting part 33a turns off the power supply to the periphery equipment 7. The periphery equipment 7 is kept in a reset state so that when the position of the gearshift is changed from the reverse position, the periphery equipment 7 is restarted immediately.

Once the resetting part 33a performs the reset process for the periphery equipment 7, the system control micro-computer 33 determines whether or not an interruption process has occurred (a step S304). An example of the interruption process is a memory maintenance performed when the periphery equipment 7 is reset.

In a case where the system control micro-computer 33 determines that the interruption process has occurred (Yes in the step S304), the system control micro-computer 33 performs the interruption process (a step S305).

In a case where the system control micro-computer 33 has performed the interruption process, or where the system control micro-computer 33 determines that the interruption process has not occurred (No in the step S304), the shift detector 33b determines whether or not the position of the gearshift is the reverse position (a step S306).

In a case where the shift detector 33b determines that the position of the gearshift is the reverse position (Yes in the step S306), the resetting part 33a keeps the periphery equipment 7 in the reset state (the step 5303) and the system control micro-computer 33 determines again whether or not the interruption process has occurred (the step S304). After that, until the shift detector 33b determines that the position of the gearshift is not the reverse position, the steps from S303 to S306 is repeatedly performed.

In a case where the shift detector 33b determines that the position of the gearshift is not the reverse position (No in the step S306), the resetting part 33a sends the reset signal RS to the multimedia micro-computer 31 (a step S307). Thus, the multimedia micro-computer 31 is reset after the position of the gearshift is determined to have changed from the reverse position. Therefore, the image decoder 32 linked to the multimedia micro-computer 31 is also reset after the position of the gearshift is determined to have changed from the reverse position. In other words, while the position of the gearshift is the reverse position, the image decoder 32 displays the captured image PP on the display 5.

Once sending the reset signal RS to the multimedia micro-computer 31, the resetting part 33a restarts the camera 4 and devices relating to the camera 4 by turning on power (a step S308). One among the devices relating to the camera 4 is a device that stores operation setting of the camera 4.

Once restarting the camera 4 and the like, the resetting part 33a restarts the periphery equipment 7 by supplying power (a step S309). At this time, since the periphery equipment 7 is kept in the reset state by the resetting part 33a, the periphery equipment 7 can be started immediately. Moreover, since the camera 4 and the like are restarted prior to the periphery equipment 7, an image can be displayed immediately. Once the resetting part 33a restarts the periphery equipment 7 by supplying power, the steps of the process of the system control micro-computer 33 end.

<1-4. Image Shift>

Figure 7:
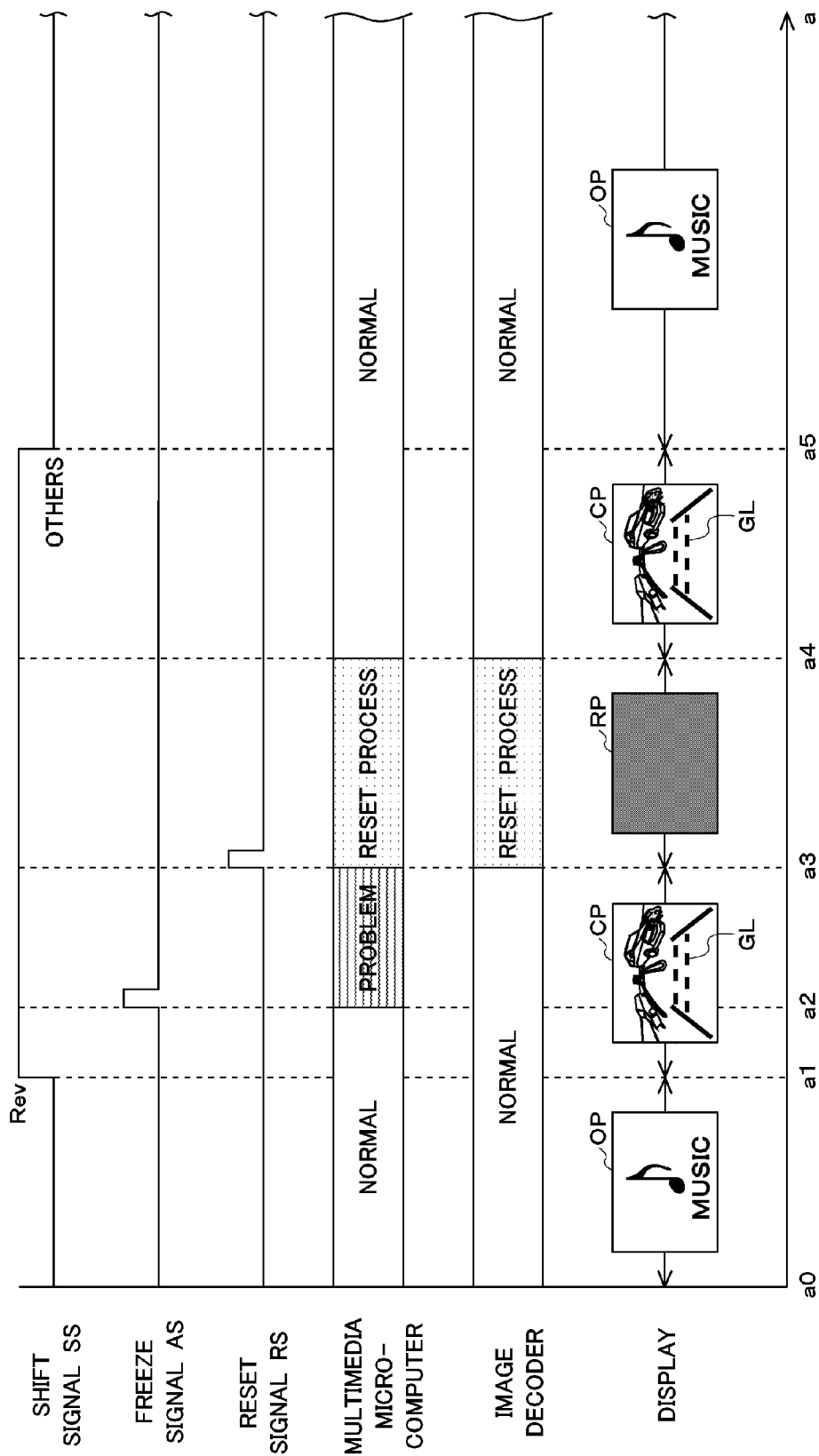
FIG. 7 illustrates a time chart showing shift of an image on a display.

Next described will be a shift of an image displayed on the display 5. FIG. 7 illustrates a time chart showing the shift of the image displayed on the display 5, and shows a case where once a problem occurred on the multimedia micro-computer 31, the reset process is performed. A horizontal axis a represents time course.

In a case where reverse is off as the position of the gearshift, i.e., the position of the gearshift is a position other than the reverse position and also where the multimedia micro-computer 31 works normally, the regular image OP, such as the operation image and the like for the periphery equipment 7, is displayed on the display 5 (a time point a0).

In a case where reverse is on as the position of the gearshift, i.e., the position of the gearshift is changed to the reverse position, an image displayed on the display 5 is changed from the regular image OP to the composite image CP generated by combining the guiding lines GL with the image showing the area behind the vehicle 2 (a time point a1). Thus, the driver who changes the position of the gearshift to the reverse position can back the vehicle 2, watching the area behind the vehicle 2 and the guiding lines GL. After the time point a1, the freeze detector 32d determines presence or absence of freeze of the composite image CP.

After that, in a case where a problem has occurred with respect to the multimedia micro-computer 31, the freeze detector 32d sends the freeze signal AS to the system control micro-computer 33 (a time point a2).

Once receiving the freeze signal AS, the system control micro-computer 33 sends the reset signal RS to the multimedia micro-computer 31 (a time point a3). Thus, the multimedia micro-computer 31 and the image decoder 32 are reset. Once the image decoder 32 is reset, an image signal is not sent to the display 5 and thus the display 5 becomes a no-image state RP. Since the position of the gearshift is still the reverse position at the time point a3, the driver is backing the vehicle 2. At that time, if the display 5 suddenly becomes the no-image state RP, the driver may be confused by the unexpected state of the image and the state may pose a problem to driving the vehicle 2, and the driver may have a problem with backing the vehicle 2.

Moreover, in a case where the problem with respect to the multimedia micro-computer 31 is left unsolved, having the composite image CP frozen, until the reset process is performed after the position of the gearshift is changed from the reverse position, there may be a problem with backing a vehicle. In other words, while backing the vehicle 2, the driver may not notice that the vehicle 2 is approaching an obstacle in the area behind the vehicle 2 because the composite image CP is frozen. In addition, since the frozen composite image CP does not include an obstacle entering the area behind the vehicle 2 after the composite image CP has frozen, the driver may not notice the obstacle entering the area behind the vehicle 2. Generally, the driver sees various directions to check safety while backing the vehicle 2. Thus, it is not easy for the driver to notice that the composite image CP is frozen while backing the vehicle 2.

Once the reset process ends, and the multimedia micro-computer 31 and the image decoder 32 return to a normal state, a composite image is displayed again on the display 5 (a time point a4).

Once the driver ends backing the vehicle 2, the position of the gearshift is changed to a position other than the reverse position, and then the regular image OP, instead of the composite image CP, is displayed on the display 5 (a time point a5).

Figure 8:
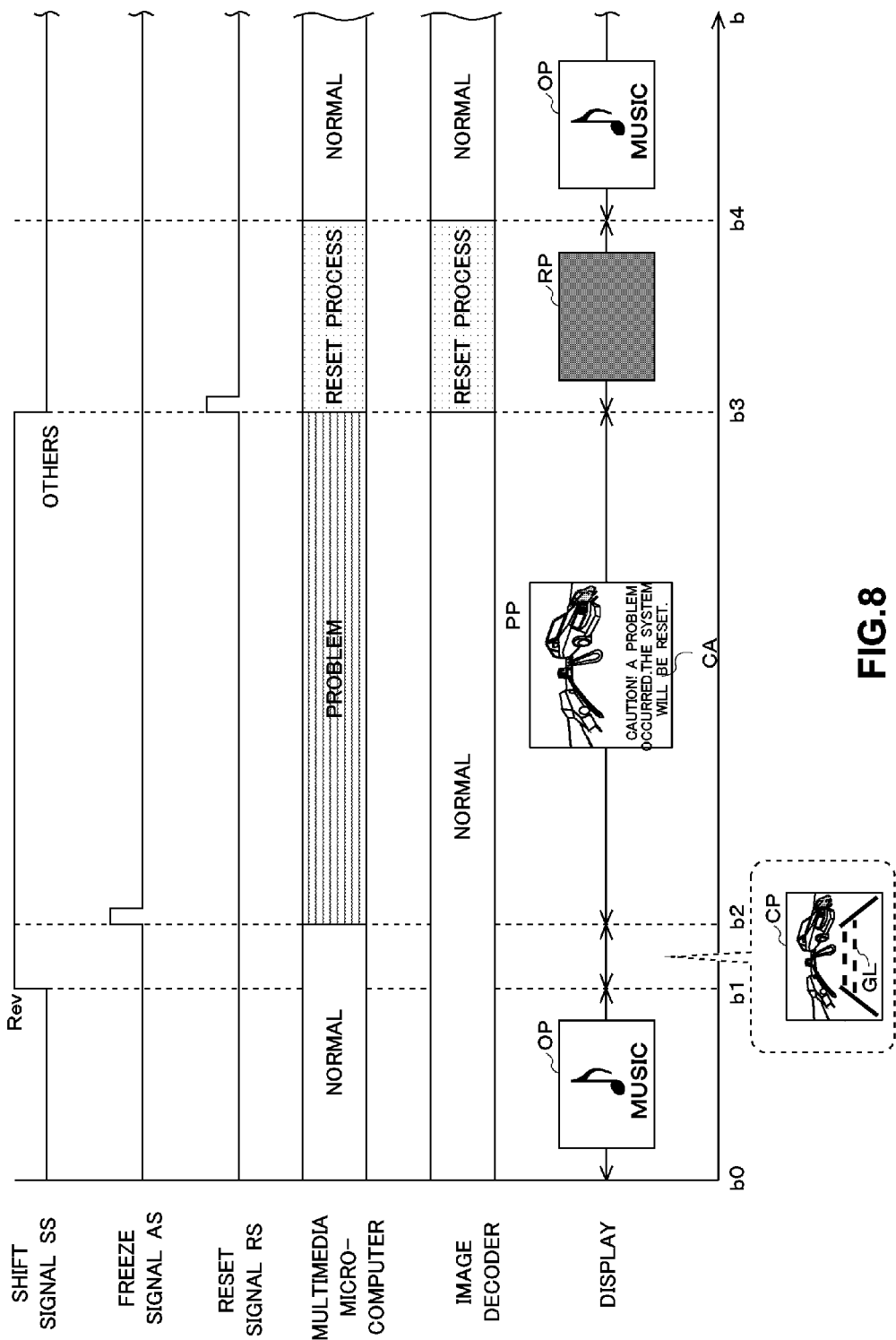
FIG. 8 illustrates a time chart showing shift of an image on the display.

FIG. 8 illustrates a time chart showing the shift of the image displayed on the display 5, and shows a case where while the multimedia micro-computer 31 has a problem, the captured image PP is displayed and then the reset process is performed after the position of the gearshift is determined to have changed from the reverse position. A horizontal axis b represents time course.

Since a time period from a time point b0 to a time point b1 is the same as the time period from the time point a0 to the time point a1, the time period will not be described.

After a time point (the time point b1) at which the position of the gearshift is changed to the reverse position, if a problem has occurred with respect to the multimedia micro-computer 31, the freeze signal AS is sent from the image decoder 32 to the system control micro-computer 33. However, at this time point (a time point b2), the reset process is not performed. Once the freeze detector 32d detects the freeze of the composite image CP, the displaying part 32c changes an image to be sent to the display 5 from the composite image CP to the captured image PP combined with the notifying image CA (the time point b2). Thus, since the driver can watch the area behind the vehicle 2, the driver can see an obstacle approaching the vehicle 2 or entering the travelling course of the vehicle 2. Therefore, there is no problem with backing the vehicle 2.

When the driver ends backing the vehicle 2, the position of the gearshift is changed to a position other than the reverse position (a time point b3). At this time point, the freeze detector 32d sends the freeze signal AS to the system control micro-computer 33. Once receiving the freeze signal AS, the system control micro-computer 33 causes the multimedia micro-computer 31 to be reset and then the image decoder 32 to be reset. Once the image decoder 32 is reset, the display 5 becomes the no-image state RP (the time point b3). However, since the notifying image CA is displayed to give notice beforehand of occurrence of the problem and implementation of the reset process, the driver is not confused by the no-image state RP of the display 5. Moreover, the driver may not have a problem with backing the vehicle 2 because the position of the gearshift has been changed from the reverse position.

Once the reset processes for the multimedia micro-computer 31 and the image decoder 32 end, the regular image OP is displayed on the display 5 because the position of the gearshift is the position other than the reverse position (a time point b4).

As described above, in a case where a problem has occurred with respect to the multimedia micro-computer 31 while the position of the gearshift of the vehicle 2 is determined to be a predetermined position, such as the reverse position, the image processing apparatus 3 in the first embodiment does not perform the reset process for the multimedia micro-computer 31 while the position of the gearshift remains the predetermined position, such as the reverse position. The image processing apparatus 3 in the first embodiment performs the reset process after the position of the gearshift is determined to have changed from the predetermined position. Moreover, the captured image captured by the camera 4 is displayed on the display 5, without going through the multimedia micro-computer 31, for a time period from a time point at which the problem has occurred with respect to the multimedia micro-computer 31 to a time point at which the reset process is performed. Thus, it is possible to prevent an image on the display 5 from suddenly disappearing while the driver is driving the vehicle 2. The driver can continuously drive the vehicle 2, watching the captured image captured by the camera 4, although the driver cannot watch a composite image generated by the multimedia micro-computer 31.

<2. Second Embodiment>

<2-1. Outline>

In the first embodiment, after the position of the gearshift is determined to have changed from the reverse position, once the reset process ends, the regular image OP is displayed on the display 5 (the time point b4 in FIG. 8). On the other hand, a second embodiment describes a process performed after a position of a gearshift is determined to have changed from a reverse position, but the position of the gearshift is changed back to the reverse position during a reset process.

As described above, a shift detector 32f of an image decoder 32 determines that the position of the gearshift has been changed after a predetermined time period (chattering preventive period) has passed. Thus, it is possible to prevent false detection of the position of the gearshift caused by chattering.

In the second embodiment, the chattering preventive period measured by the shift detector 32f after the reset process ended is shortened. In a case where the position of the gearshift is changed back to the reverse position during the reset process, a reset process period and the chattering preventive period run in parallel. In this case, the chattering preventive period entirely runs out or partially runs during the reset process. Therefore, in the case where the position of the gearshift is changed back to the reverse position during the reset process, the changed position of the gearshift after the reset process is estimated. A composite image CP combined with guiding lines GL is displayed on a display 5 immediately after the reset process ends so that the driver can immediately back a vehicle 2 after the reset process ends, watching the composite image CP. The second embodiment partially includes a same configuration and process as the configuration and the process in the first embodiment. Therefore, a difference from the first embodiment will be mainly described below.

<2-2. Configuration>

Figure 9:
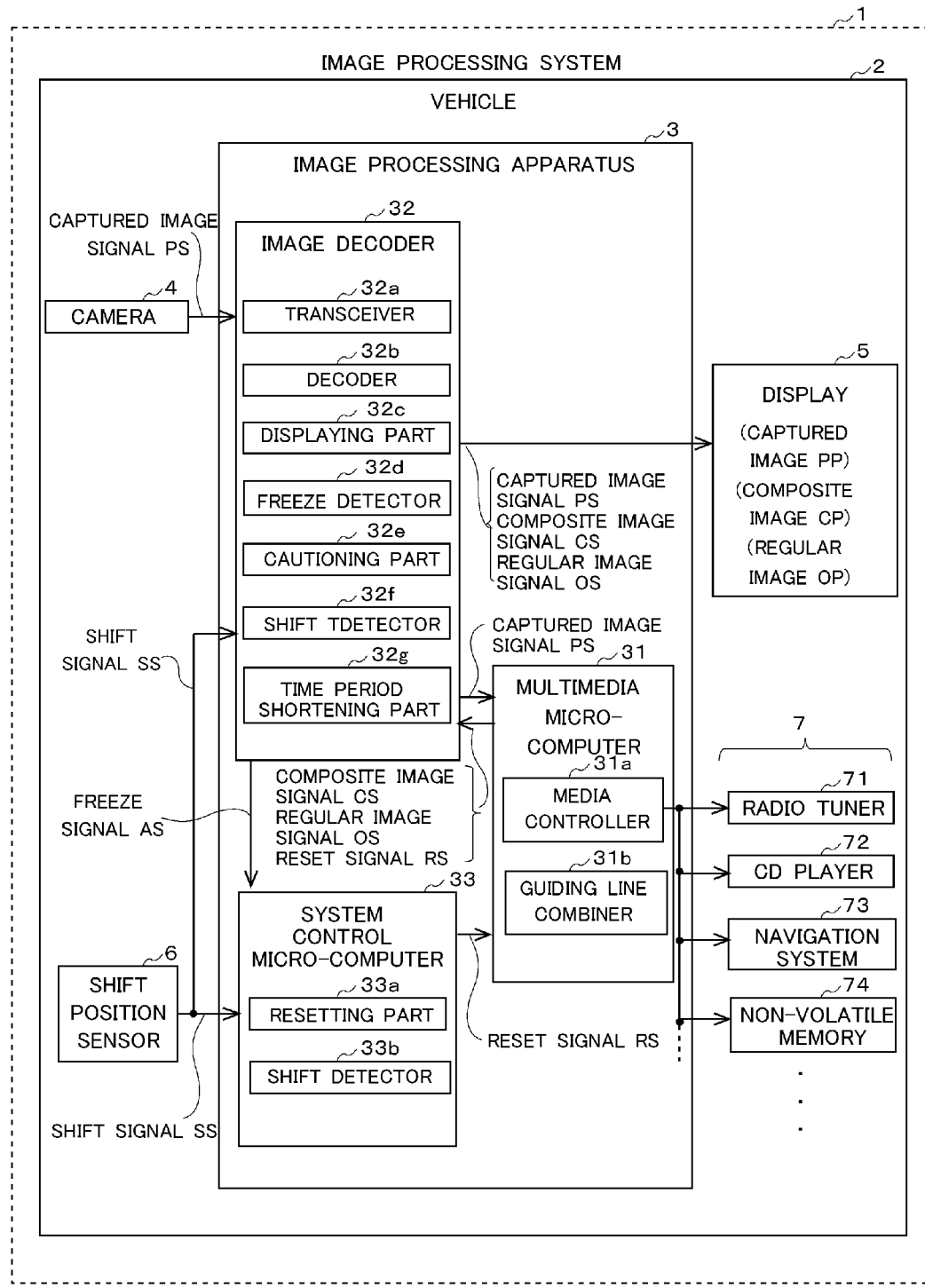
FIG. 9 illustrates a configuration of an image processing system in a second embodiment.

FIG. 9 illustrates a configuration of an image processing apparatus 3 in the second embodiment. The image processing apparatus 3 in the second embodiment includes the image decoder 32 having a time period shortening part 32g.

The time period shortening part 32g shortens the foregoing chattering preventive period measured immediately after the reset process ended. Once the time period shortening part 32g shortens the chattering preventive period, the shift detector 32f determines a change of the position of the gearshift based on the shortened chattering preventive period. In a case where the position of the gearshift is changed during the reset process, the chattering preventive period is started to be measured by the shift detector 32f immediately after the reset process ends. The chattering preventive period cannot be measured during the reset process because the shift detector 32f is not activated during the reset process.

In a case where the chattering preventive period is set to 500 msec., the time period shortening part 32g sets the chattering preventive period to a value less than 500 msec., for example, 250 msec. However, it is recommended that the time period shortening part 32g should shorten the chattering preventive period to zero (0) msec. because the driver can back the vehicle 2 immediately after the reset process ends, watching the composite image CP. Thus, in a case where the position of the gearshift is changed during the reset process, the shift detector 32f determines the positions of the gearshift after the reset process ends regardless of progress of the chattering preventive period that is started to be measured after the reset process ends. The position of the gearshift determined here is a control gearshift position.

<2-3. Steps>

Figure 10:
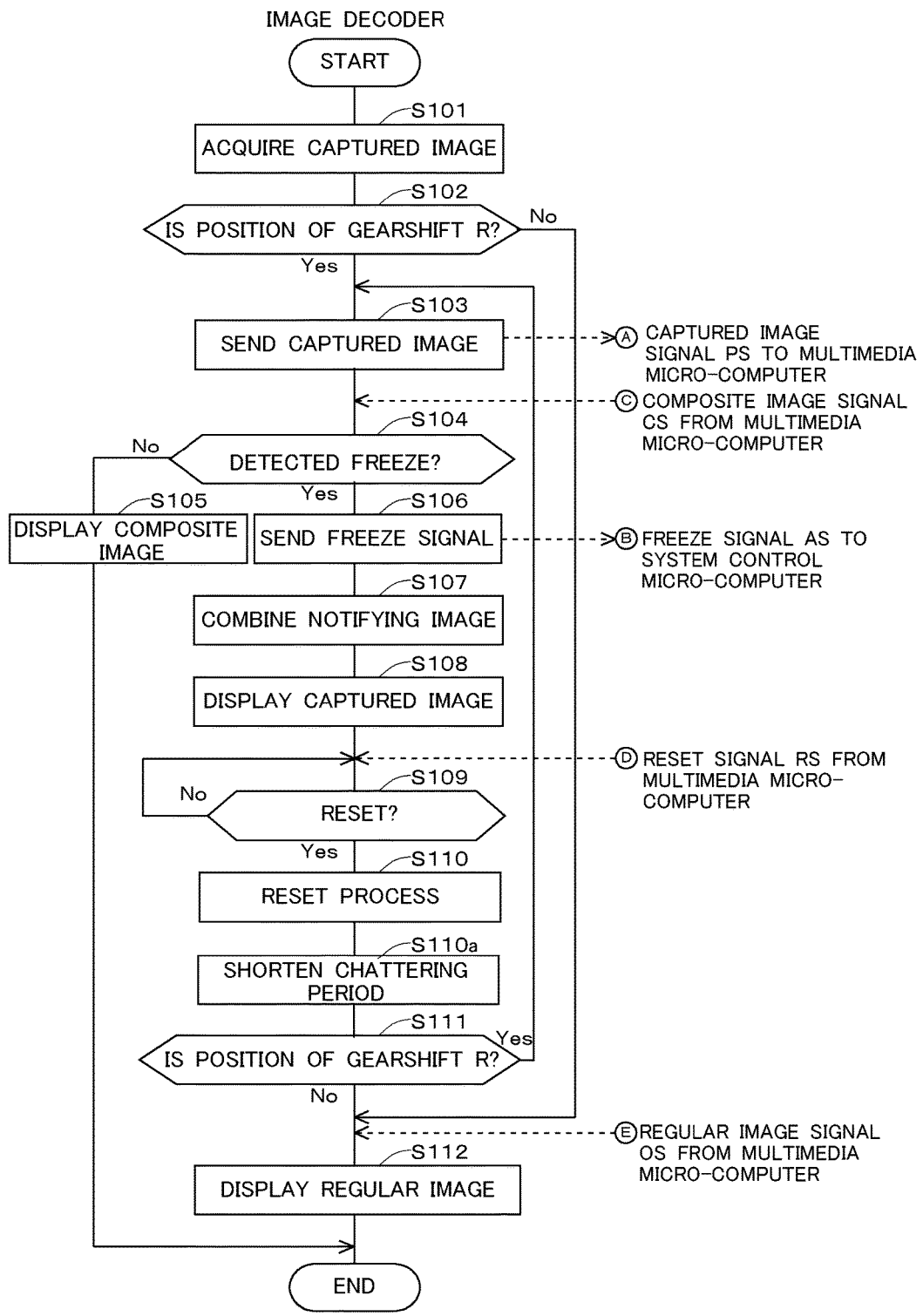
FIG. 10 illustrates a flowchart showing steps of a process performed by an image decoder in the second embodiment.

FIG. 10 illustrates a flowchart showing steps of a process performed by the image decoder 32 in the second embodiment. The steps of the process in the second embodiment include a step S110a after the step S110 in the steps of the first embodiment. Therefore, the step S110a will be mainly described below.

Once the reset process ends in the step S109, the time period shortening part 32g shortens the chattering preventive period.

Once the time period shortening part 32g shortens the chattering preventive period, the shift detector 32f waits for end of the shorten chattering preventive process and then determines whether or not the position of the gearshift is the reverse position (a step S111). In a case where the chattering preventive period is shortened to zero (0) msec., once the reset process ends, the shift detector 32f determines the position of the gearshift. The steps performed based on a result determined by the shift detector 32f are described above.

<2-4. Image Shift>

Figure 11:
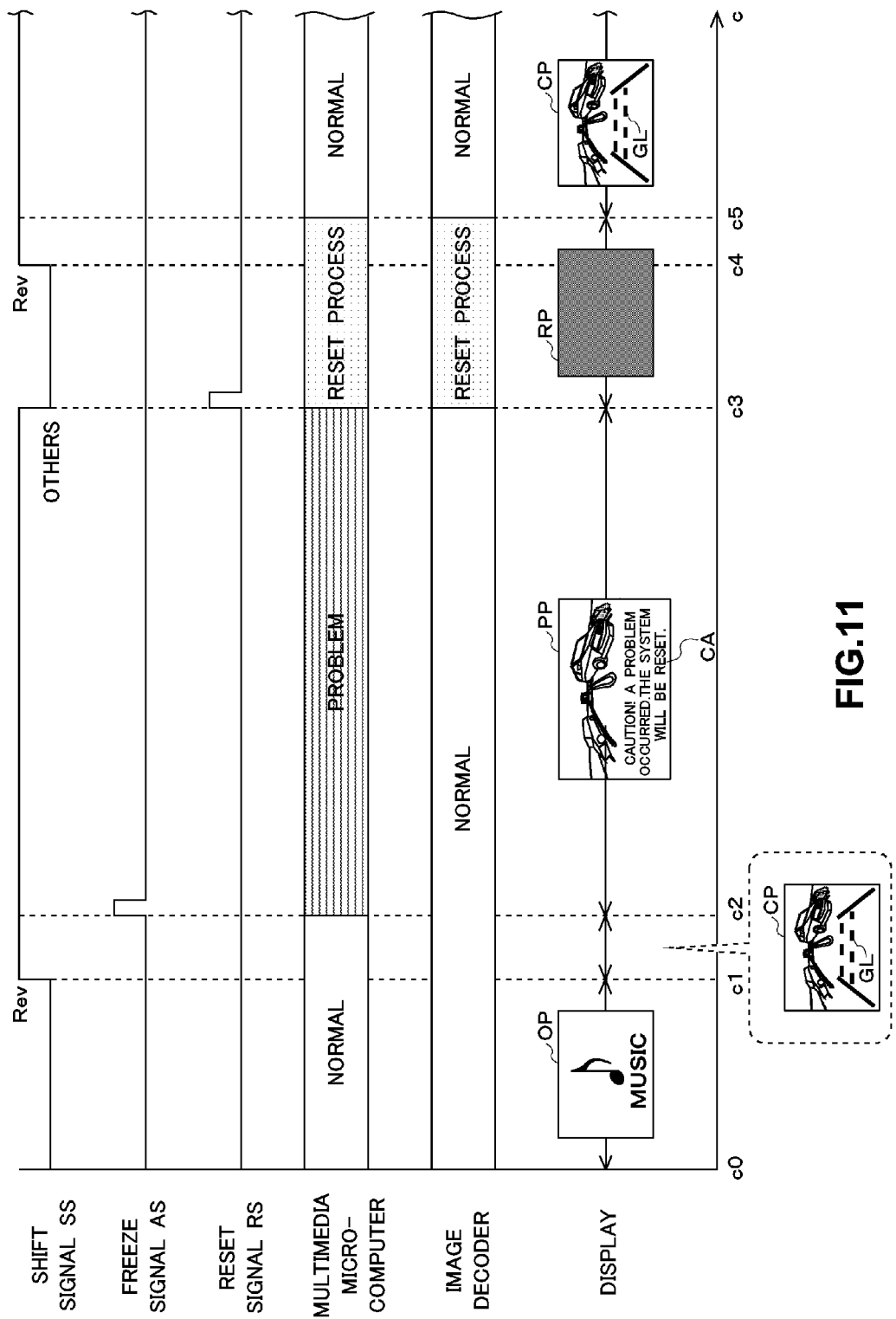
FIG. 11 illustrates a time chart showing shift of an image on a display in the second embodiment.

Next described will be a shift of an image displayed on the display 5 in the second embodiment. FIG. 11 illustrates a time chart showing the shift of the image displayed on the display 5, and shows a case where the position of the gearshift is the reverse position during the reset process. A horizontal axis c represents time course.

Since a time period from a time point c0 to a time point c3 is the same as the time period from the time point b0 to the time point b3, the time period will not be described.

Even in a case where the position of the gearshift is changed to the reverse position while the multimedia micro-computer 31 and the image decoder 32 are being reset (a time point c4), the reset process continues to be performed. At this time point, the shift detector 32f does not work because the image decoder 32 performs the reset process.

Once the reset process ends, the time period shortening part 32g shortens the chattering preventive period (a time point c5). In this embodiment, the chattering preventive period is shortened from 500 msec. to zero (0) msec.

The shift detector 32f determines the change of the position of the gearshift made in the reset process at a substantially same time as end of the reset process because the chattering preventive period has been shortened to zero (0) msec. (a time point c5).

Once the change of the position of the gearshift to the reverse position is determined by the shift detector 32f, the image decoder 32 displays the composite image CP showing an area behind the vehicle 2 on the display 5. Thus, in a case where the driver changes the position of the gearshift to the reverse position during the reset process, the driver can back the vehicle 2, watching the composite image CP showing the area behind the vehicle 2 immediately after the reset process ends without waiting for end of the chattering preventive period.

As described above, the image processing apparatus 3 in the second embodiment shortens the chattering preventive period that is a period until the time period shortening part 32g of the image decoder 32 determines the change of the position of the gearshift. Especially, the time period shortening part 32g shortens the chattering preventive period to zero (0) msec. Thus, in a case where the driver changes the position of the gearshift to, for example, the reverse position, during the reset process, the driver can watch, immediately after the reset process, the composite image CP combined with the guiding lines GL, and can back the vehicle 2 promptly. Moreover, since the position of the gearshift has been changed during the reset process, the chattering preventive period and the reset process period run in parallel. Therefore, if the chattering preventive period that starts to be measured after the reset process ends is shortened to zero (0) msec., determination on the change of the position of the gearshift generally does not have a problem because, actually, the chattering preventive period partially or entirely runs in the reset process.

<3. Modifications>

The invention is not limited to the foregoing embodiments but various modifications are possible. Examples of those modifications of the invention will be described below. Any form of the embodiments described above and the modifications described below may be arbitrarily combined with one another.

In the foregoing embodiments, the case where the position of the gearshift is the reverse position is described. However, the position of the gearshift may be a different position, for example, a drive position. In this case, it is recommended that if the position of the gearshift becomes the drive position, an image showing an area in front of the vehicle, especially a lower area in front of the vehicle or a lower area of right and left side of the vehicle, instead of the area behind the vehicle, should be displayed on a display because those areas are often blind corners for the driver when the driver drives the vehicle forward. In this case, too, when a problem has occurred with respect to a micro-computer, the reset process should not be performed immediately but should be performed at a time at which the position of the gearshift is changed from the drive position. While the micro-computer has the problem, the captured image captured by a camera may be displayed on the display without image processing. Thus, while the driver is driving the vehicle 2 forward, an image for safety check does not suddenly disappear so that safety of driving the vehicle can be improved.

In the foregoing embodiment, the shift position sensor 6 detects a position of the gearshift of an automatic transmission, as an example. However, the position of the gearshift detected by the shift position sensor 6 may be a position of a gearshift of a manual transmission. In this case, the shift position sensor 6 detects the position of the gearshift from amongst a neutral position, a low position, a second position, a third position, a top position and a reverse position.

In the foregoing embodiments, the function described as one block is not necessarily implemented by a single physical element, but may be implemented by separate physical elements. Further, in the foregoing embodiments, the function described as a plurality of blocks may be implemented by a single physical element. Further, a process relating to one arbitrary function may be shared and implemented by apparatuses inside and outside the vehicle, and the function may be implemented as a whole by exchanging information via communications between those apparatuses.

Moreover, in the foregoing embodiments, the configuration described as hardware may be implemented by software, and the configuration described as software may be implemented by hardware. Also, a configuration may be achieved by combination of software and hardware.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus that processes images, the image processing apparatus comprising:
   a shift position sensor that detects a position of a gearshift for gear change of a vehicle on which the image processing apparatus is mounted, and outputs a shift signal;
   a camera mounted on the vehicle and that captures an image of an object in a surrounding of the vehicle and generates an image signal;
   an image processor that receives the image signal from the camera and that outputs the acquired captured image represented by the image signal to a display when the image processor determines that the shift signal output by the shift position sensor indicates that the position of the gearshift is a predetermined position;
   a first micro-computer that controls the image processor and that combines the captured image with a diagram to create a composite image that the first micro-computer supplies to the image processor for output by the image processor to the display;
   the image processor detecting whether a problem exists in the first micro-computer based on the composite image supplied to the image processor from the first micro-computer; and
   a second micro-computer that performs a reset process of the first micro-computer when the image processor has detected that the problem exists with respect to the first micro-computer, wherein
   when the image processor has detected the problem with respect to the first micro-computer while the position of the gearshift is determined to be the predetermined position, (i) the second micro-computer does not perform the reset process of the first micro-computer while the position of the gearshift remains the predetermined position and the image processor continuously outputs the acquired captured image without the diagram to the display while the position of the gearshift remains the predetermined position, and (ii) the second micro-computer performs the reset process after the position of the gearshift is determined to have changed from the predetermined position.

2. The image processing apparatus according to claim 1, wherein
   the predetermined position of the gearshift is a reverse position.

3. The image processing apparatus according to claim 1, wherein
   the image processor provides a notification to a user, during a time period from a first time point at which the image processor has detected the problem to a second time point at which the second micro-computer performs the reset process, that the reset process will be performed.

4. The image processing apparatus according to claim 1, wherein the image processor determines, based on the shift signal, a control gearshift position of the gearshift of the vehicle, after a predetermined time period has passed from a change of the shift signal, and when the shift signal is changed during the reset process, the image processor determines the control gearshift position after the reset process ends, regardless of progress of the predetermined time period.

5. An image processing method of processing images, the image processing method comprising the steps of:
   (a) detecting a position of a gearshift for gear change of a vehicle based on a shift signal output by a shift position sensor of the vehicle;
   (b) receiving, by an image processor, an image signal generated by a camera mounted on the vehicle, the image signal representing a captured image of an object in surroundings of the vehicle, the image processor outputting the acquired captured image to a display of the vehicle when the image processor determines that the shift signal output by the shift position sensor indicates that the position of the gearshift is a predetermined position;
   (c) combining, by a first micro-computer that controls the image processor, the captured image with a diagram to create a composite image that the first micro-computer supplies to the image processor for output by the image processor to the display;
   (d) detecting, by the image processor, whether a problem exists in the first micro-computer based on the composite image supplied to the image processor from the first micro-computer; and
   (e) performing, by a second micro-computer, a reset process of the first micro-computer when the step (d) has detected that the problem exists with respect to the first micro-computer, wherein when the step (d) has detected the problem with respect to the first micro-computer while the position of the gearshift is determined to be the predetermined position, the step (e) does not perform the reset process of the first micro-computer while the position of the gearshift remains the predetermined position and the image processor continuously outputs the acquired captured image without the diagram to the display while the position of the gearshift remains the predetermined position, and the step (e) performs the reset process after the position of the gearshift is determined to have changed from the predetermined position.

6. The image processing method according to claim 5, wherein the predetermined position of the gearshift is a reverse position.

7. The image processing method according to claim 5, further comprising the step of:
   (f) notifying a user, during a time period from a first time point at which the step (d) detected the problem to a second time point at which the step (e) performs the reset process, that the reset process will be performed.

8. The image processing method according to claim 5, wherein the step (a) determines, based on the shift signal, a control gearshift position of the gearshift of the vehicle, after a predetermined time period has passed from a change of the shift signal, and when the shift signal is changed during the reset process, the image processor determines the control gearshift position after the reset process ends, regardless of progress of the predetermined time period.

* * * * *